(12) United States Patent
Gamalski et al.

(10) Patent No.: US 11,923,604 B2
(45) Date of Patent: Mar. 5, 2024

(54) ROTATING MULTI-BEAM ANTENNA

(71) Applicant: Raytheon Company, Waltham, MA (US)

(72) Inventors: Andrew David Gamalski, Tucson, AZ (US); Jaime Robledo, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 225 days.

(21) Appl. No.: 17/339,845

(22) Filed: Jun. 4, 2021

(65) Prior Publication Data
US 2022/0393340 A1 Dec. 8, 2022

(51) Int. Cl.
*H01Q 1/28* (2006.01)
*F41G 7/22* (2006.01)
*G01S 13/42* (2006.01)
*G01S 13/50* (2006.01)
*G01S 13/88* (2006.01)

(52) U.S. Cl.
CPC .......... *H01Q 1/281* (2013.01); *F41G 7/2246* (2013.01); *F41G 7/2286* (2013.01); *G01S 13/426* (2013.01); *G01S 13/50* (2013.01); *G01S 13/883* (2013.01)

(58) Field of Classification Search
CPC ........ H01Q 1/281; H01Q 3/10; F41G 7/2246; F41G 7/2286; G01S 13/426; G01S 13/50; G01S 13/883
See application file for complete search history.

(56) References Cited

U.S. PATENT DOCUMENTS

| | | | |
|---|---|---|---|
| 3,699,574 A | | 10/1972 | OHara et al. |
| 3,806,932 A | * | 4/1974 | Dietrich ................ H01Q 3/28 |
| | | | 343/DIG. 2 |
| 3,903,523 A | | 9/1975 | Hartley |
| 6,307,514 B1 | * | 10/2001 | West .................. F42B 30/006 |
| | | | 343/705 |
| 2017/0153325 A1 | * | 6/2017 | Moreira Neto ....... G01S 13/935 |
| 2018/0123229 A1 | | 5/2018 | Stratis et al. |

OTHER PUBLICATIONS

International Search Report and English Translation of Box V of the Written Opinion dated Apr. 12, 2023, received fir corresponding PCT Application No. PCT/US2022/072761, pp. 16, dated Jun. 3, 2022.

International Preliminary Report on Patentability dated Dec. 14, 2023, for corresponding PCT Application No. PCT/US2022/072761.

* cited by examiner

*Primary Examiner* — Matthew M Barker

(74) *Attorney, Agent, or Firm* — Kinney & Lange, P.A.

(57) ABSTRACT

Apparatus and associated methods relate to using a plurality of antennas radially distributed about a rotatable turret to sequentially scan a field of view. Each of the plurality of antennas directs an electromagnetic beam and senses its reflection along a principal direction defined by a roll position of the rotatable turret and an azimuthal beam angle. The principal directions of the antennas have a unique azimuthal beam angle relative to a boresight (i.e., axis of rotation). As the turret rotates, each of these antennas is sequentially turned on at a first roll position and off at a second roll position. This enables electromagnetic beams generated by the antennas to pan a scene both in azimuth and roll. An image processor then determines, based on the reflected signals received by the plurality of antennas, directions to and/or velocities of objects within the scanned field of view.

19 Claims, 7 Drawing Sheets

ROTATING MULTI-BEAM ANTENNA

BACKGROUND

Radar scanning systems are used for a variety of reasons. For example, airports can be equipped with sophisticated radar scanning systems so as to accurately map air traffic to and from the airport. Various military applications include airplanes, ships, missiles, etc. Such military purposes can include detection of enemy vehicles, identifying drones, location determination of ground structures, collision avoidance, guidance of vehicles, etc. Various commercial applications include object detection for cars equipped with automatic navigations technology. Traditional radar scanning systems can be complex, large, heavy, and/or costly. It would be advantageous to develop a relatively elegant, small, light, and/or relatively low-cost radar scanning system.

SUMMARY

Apparatus and associated methods relate to a system for radar-scanning a field of view. The system includes a signal generator, a plurality of antennas, and an image processor. The signal generator generates electromagnetic signals. The plurality of antennas is radially distributed about a rotatable turret. Each of the plurality of antennas is electrically connected to the signal generator so as to receive an electromagnetic signal that causes the antenna to direct an electromagnetic beam along a principal direction characterized by a rotational position $\theta$ to which the antenna is rotated by the rotatable turret and an azimuthal beam angle $\phi$ with respect to a rotational axis of the rotatable turret. The azimuthal beam angles of the plurality of antennas are different from one another. Each of the plurality of antennas senses a reflected portion of the electromagnetic beam reflected from objects within the field of view upon to which the electromagnetic beam has been directed. As the rotatable turret rotates about the rotational axis, the principal directions sweep conical figures about the rotational axis. At least a portion of the conical figures intersect the field of view. The image processor determines, based on the reflected portions of the electromagnetic beams sensed by the plurality of antennas, directions and/or ranges to and/or velocities of the objects within the field of view.

Some embodiments relate to a system for radar-scanning a ground-surface field of view. The system includes a signal generator, a plurality of antennas and an image processor. The signal generator generates electromagnetic signals. The plurality of antennas are radially distributed about a nose-cone of a missile. Each of the plurality of antennas is electrically connected to the signal generator so as to receive an electromagnetic signal that causes the antenna to direct an electromagnetic beam along a principal direction characterized by a roll orientation $\theta$ to which the antenna is rotated by the missile and an azimuthal beam angle $\phi$ with respect to a roll axis of the missile. The azimuthal beam angles of the plurality of antennas are different from one another. Each of the plurality of antennas senses a reflected portion of the electromagnetic beam reflected from objects within the ground-surface field of view upon to which the electromagnetic beam has been directed. As the missile rotates about the roll axis, the principal directions sweep conical figures about the roll axis. At least a portion of the conical figures intersect the ground-surface field of view. The image processor determines, based on the reflected portions of the electromagnetic beams sensed by the plurality of antennas, directions and/or ranges to and/or velocities of the objects within the ground-surface field of view.

A further embodiment of the foregoing method for radar-scanning a field of view. the method includes generating, via a signal generator, electromagnetic signals. The method includes receiving, via a plurality of antennas radially distributed about a rotatable turret, the electromagnetic signals generated by the signal generator. The method includes rotating the rotatable turret about a rotational axis. The method includes directing, via each of the plurality of antennas, an electromagnetic beam along a principal direction characterized by a rotational position $\theta$ to which the antenna is rotated by the rotatable turret and an azimuthal beam angle $\phi$ with respect to a rotational axis of the rotatable turret. The azimuthal beam angles of the plurality of antennas are different from one another. As the rotatable turret rotates about the rotational axis, the principal directions sweep conical figures about the rotational axis. At least a portion of the conical figures intersect the field of view. The method includes sensing, via each of the plurality of antennas, a reflected portion of the electromagnetic beam reflected from objects within the field of view upon to which the electromagnetic beam has been directed. The method also includes determining, via an image processor and based on the reflected portions of the electromagnetic beams sensed by the plurality of antennas, directions and/or ranges to and/or velocities of the objects within the field of view.

DETAILED DESCRIPTION

Apparatus and associated methods relate to using a plurality of antennas radially distributed about a rotatable turret to sequentially scan a field of view. Each of the plurality of antennas directs an electromagnetic beam and senses its reflection along a principal direction characterized by a rotational position $\theta$ of the rotatable turret and an azimuthal beam angle $\phi$ with respect to a rotational axis of the rotatable turret. The principal direction of each of the antennas having a different azimuthal beam angle (e.g., $\phi_A$) from the azimuthal beam angles (e.g., $\phi_B$-$\phi_G$) of the other antennas. At first and second rotational positions, $\theta_1$ and $\theta_2$, of the rotatable turret, each of these antennas sequentially turned on and turn off, respectively, as they are rotated to such rotational positions. This enables the electromagnetic beams directed by the antennas to pan a scene both in azimuth (e.g., for all azimuthal beam angles $\phi_A$-$\phi_G$) and rotational positions (e.g., for all rotational positions $\theta$: $\theta_1 < \theta < \theta_2$). An image processor then determines, based on the reflected electromagnetic signals detected by the plurality of antennas, directions to and/or velocities of objects within the scanned field of view.

Figure 1A:
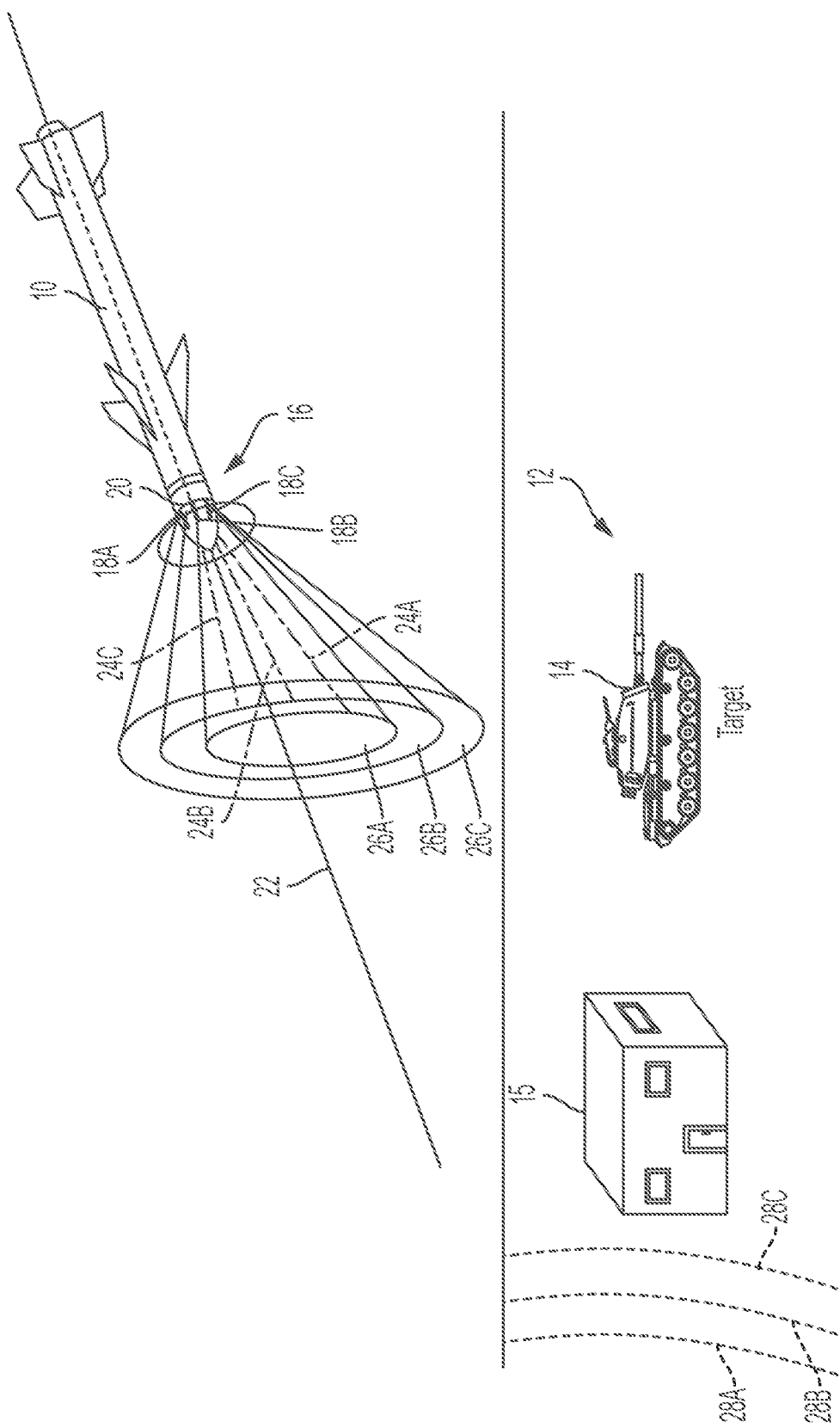
FIG. 1A is a perspective view of a missile equipped with a rotating multi-beam antenna scanning a ground-surface field of view.

FIG. 1A is a perspective view of a missile equipped with a rotating multi-beam antenna scanning a ground-surface field of view. In FIG. 1A, missile 10 is flying overhead of ground-surface field of view 12, in which target 14 operates and building 15 resides. Missile 10 is equipped with radar scanning system 16. Radar scanning system 16 includes antennas 18A-18G (only 18A-18C visible in FIGS. 1A and 1B) radially distributed about nose-cone 20 of missile 10. Nose-cone 20 is configured to rotate about roll axis 22 (i.e., rotational axis) of nose-cone 20 and missile 10. Each of the antennas 18A-18G (which are several) produces a single beam (which is fixed by the antenna design) at an azimuthal beam angle $\phi_A$-$\phi_G$, respectively, relative to the roll axis 22 of the missile 10. In some embodiments nose-cone 20 rotates with respect to a non-rotating missile, and in other embodiments, nose-cone 20 and the missile rotate together.

Figure 1B:
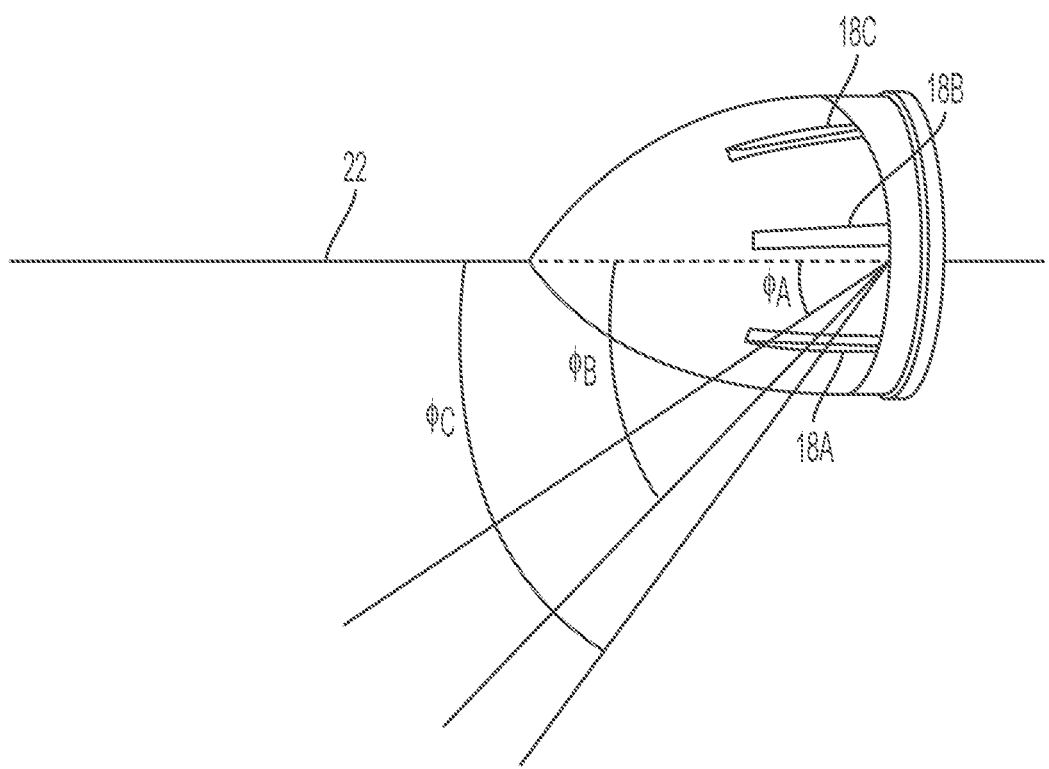
FIG. 1B is a depiction of radially distributed antennas and the azimuthal beam angles of their projected electromagnetic beams.

FIG. 1B is a depiction of radially distributed antennas and the azimuthal beam angles of their projected electromagnetic beams. Each of antennas 18A-18G is configured to direct a corresponding one of electromagnetic beams 24A-24G (only 24A-24C visible in FIG. 1A), respectively, outward from missile 10. Each of antennas 18A-18G is also configured to detect corresponding electromagnetic beams 24A-24G, respectively, if reflected from objects that intersect their projected beam paths. Such a missile system, as described with reference to FIG. 1A, is a monostatic radar system. As shown in FIG. 1B, electromagnetic beams 24A-24G are directed along principal directions that make azimuthal beam angles $\phi_A$-$\phi_G$ with roll axis 22, respectively. Each of azimuthal beam angles $\phi_A$-$\phi_G$ (only $\phi_A$-$\phi_C$ visible in FIG. 1B) corresponding to antennas 18A-18G, respectively, is different from the other azimuthal beam angles $\phi_A$-$\phi_G$ corresponding to others of antennas 18A-18G, respectively. For example, in an exemplary embodiment, $\phi_A<\phi_B<\phi_C<\phi_D<\phi_E<\phi_F<\phi_G$. Each of antennas 18A-18G has a fixed principal direction 26A-26G (only 26A-26C visible in FIG. 1A), respectively.

As nose-cone 20 of missile 10 rotates about roll axis 22 of nose-cone 20 and missile 10, antennas 18A-18G sequentially direct electromagnetic beams 24A-24G along principal directions that sweep conical figures (or conical spiral figures if missile 10 is moving) 26A-26G, respectively, about roll axis 22. Essentially, radar scanning system 16 is "looking" at one conical slice of the field of view at any given point in time. Here, the term conical figures includes conical spiral figures, which can be scanned during missile flight. Each of these sweeping conical FIGS. 26A-26G intercepts ground-surface field of view 12 along a corresponding one of paths 28A-28G (only 28A-28C visible in FIG. 1A), so as to generate a two-dimensional scan of ground-surface field of view 12. Paths 28A-28G represent the paths of the centers of electromagnetic beams 24A-24G as they intercept ground-surface field of view 12. In practice, electromagnetic beams 24A-24G have a non-zero beam width, resulting in a band of detection about paths 28A-28G. The image processor can construct a two-dimensional image of ground-surface field of view 12 based on electromagnetic beams 24A-24G reflected thereby and sensed by antennas 18A-18G, respectively. Although each antennas 18A-18G has such a fixed principal direction, the combination of different principal directions permits such two-dimensional imaging of ground-surface field of view 12.

The image processor can be further configured to determine, based on the electromagnetic beams 24A-24G reflected by objects in the ground-surface field of view 12 and then received by antennas 18A-18G, directions and/or ranges to objects within the ground-surface field of view 12, such as, for example, target 14 and building 15. Directions to objects can be determined, based on which of electromagnetic beams 24A-24G was directed toward the object, and at what roll angle θ (i.e., rotational angle or position) was the electromagnetic beam directed at the time of detection. Range of objects can be determined based on an out-and-back time of flight measured for the particular electromagnetic beam 24A-24G that was directed thereto. Object velocity can also be determined by the frequency shift (also known as the Doppler shift) of the reflected electromagnetic signal 24A-24G.

Various types of antennas can be used as antennas 18A-18G. For example, in one embodiment antennas 18A-18G can be patch antennas. In another embodiment, antennas 18A-18G can be slotted waveguides. In embodiments, such as the one described with reference to FIG. 1, only a portion of the 360° conical figures is directed toward the intended field of view In the FIG. 1 embodiment, that intended field of view is the ground-surface field of view. In such embodiments, radar scanning system 16 can further include a sequencer that sequentially activates each of the plurality of antennas 18A-18G in sequence as the principal directions of the plurality of antenna are oriented so as to scan the ground-surface field of view. In some embodiments, only one antenna is turned on at any given point in time. Each antenna is sequentially turned on at a specific roll position or roll orientation $\theta_1$ (i.e., rotational position) of missile 10 and again turned off at another specific roll position $\theta_2$. By enabling antennas 18A-18G at different specific roll axes, data can be collected across a broad scene, thereby generating a radar "image" of the terrain below missile 10. Additional image data is added to the image as each scan of the field of view is processed.

Figure 2:
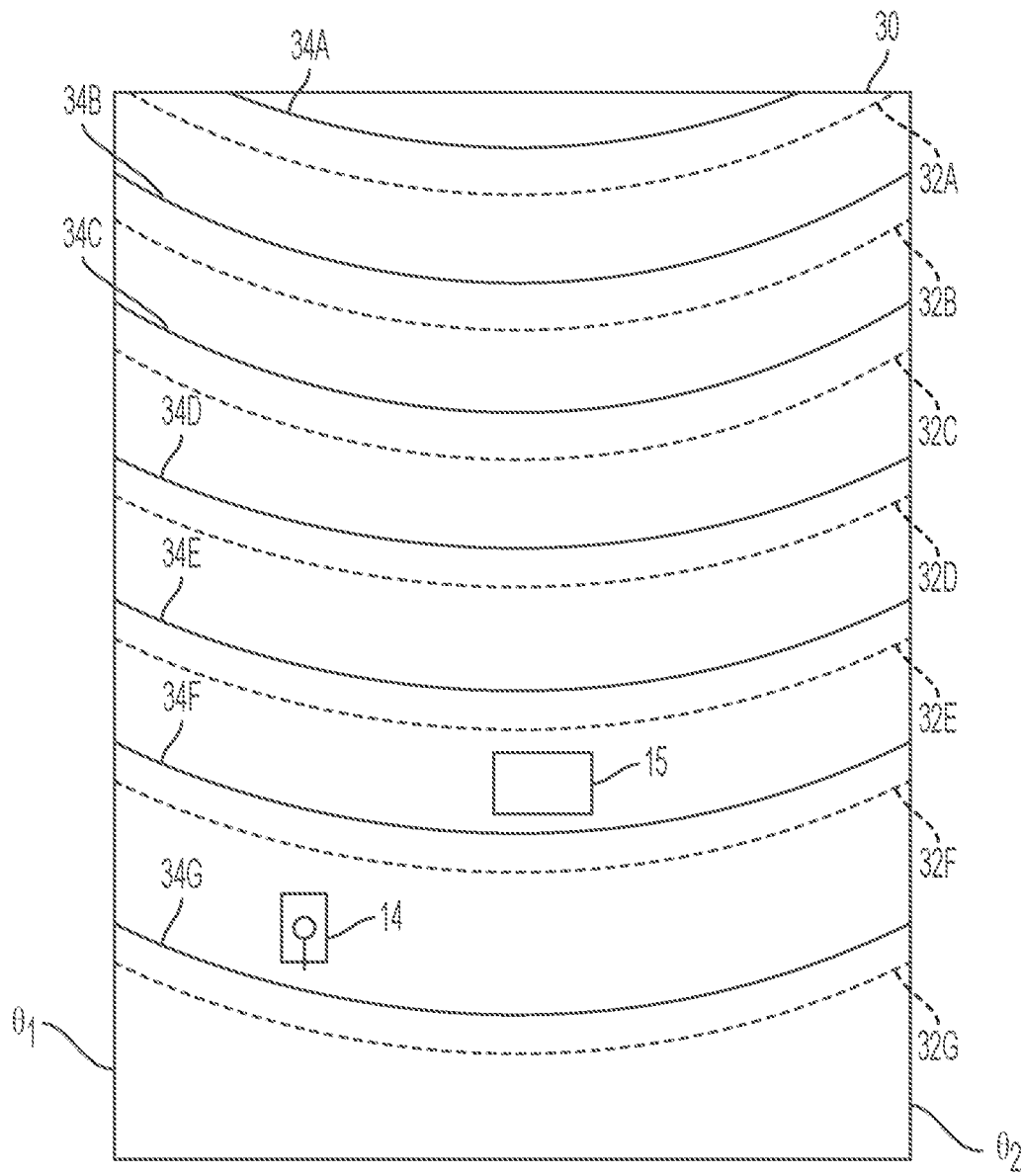
FIG. 2 is a two-dimensional image of a plan view of the ground-surface field of view scanned by the rotating multi-beam antenna.
Figure 3:
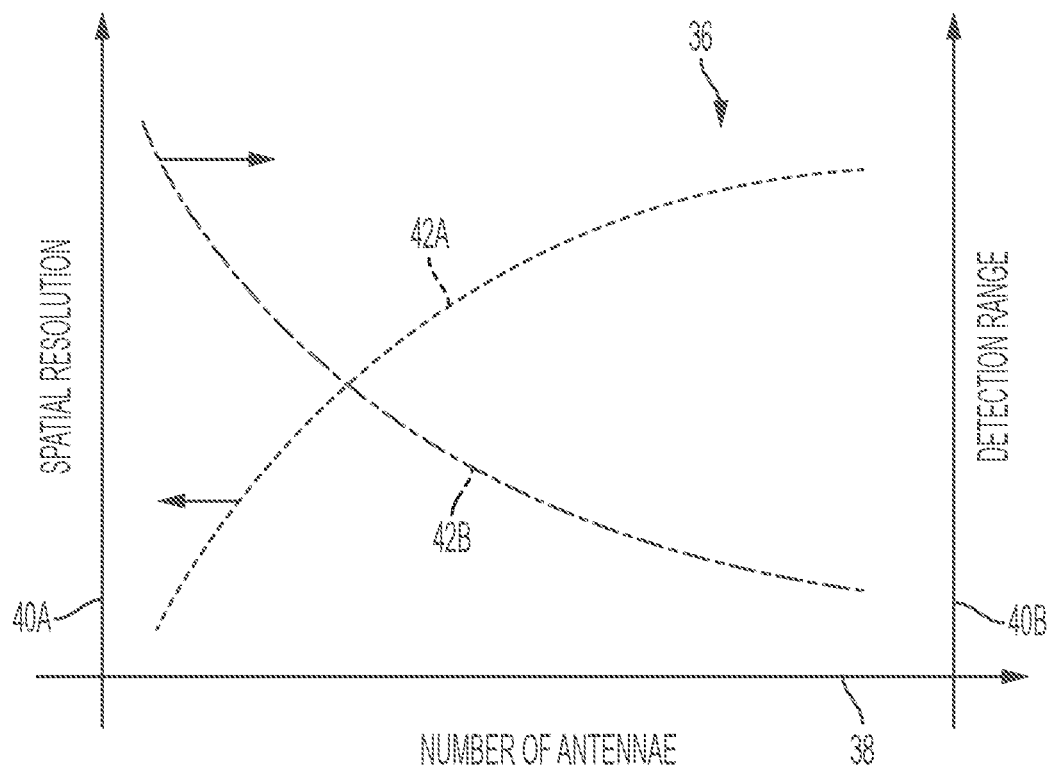
FIG. 3 is a graph depicting detection range vs. azimuthal resolution (number of antennas) tradeoff.

FIG. 2 is a two-dimensional image of a plan view of the ground-surface field of view scanned by the rotating multi-beam antenna. In FIG. 2, two-dimensional image 30 depicts ground-surface field of view 12 depicted in FIG. 1A, as generated by the image processor. Target 14' and building 15' in FIG. 2 are imagery generated of target 14 and building 15 depicted in FIG. 1A. Two-dimensional image 30 is constructed by assembling image data obtained from reflected electromagnetic signal 24A-24G, which have paths of their centers as indicated in the dotted lines 32A-32G. The reflected electromagnetic signals are processed by the image processor as swaths of image data about such paths as indicated in these dotted lines 32A-32G. These dotted lines 32A-32G indicate centers of the intersection of ground-surface field of view 12 and electromagnetic beams 24A-24G, respectively, as they are rotationally activated during rotation of missile 10. After nose-cone 20 or missile 10 has completed a complete roll cycle, missile 10 has advanced forward in space, as missile 10 is flying toward target 14 and building 15 as depicted in FIG. 1A. To illustrate the impact of the flight trajectory of missile 10 of the collection of radar scene information, image 30 includes solid lines of image data 34A-34G. These solid lines indicate the centers of the intersection of ground-surface field of view 12 and electromagnetic beams 24A-24G, respectively, as they are rotationally activated during the next rotation of missile 10 after the rotation corresponding to dotted lines 32A-32G. In this way, each rotation of missile 10 can generate additional image data depicting additional portions of ground-surface field of view 12. The image processor determines where each of lines of image data 32A-32G and 34A-34G are to be depicted within two-dimensional image 30 based on which of antennas 24A-24G obtained data pertaining thereto and further based on flight data (e.g., position data, attitude data, etc.) of missile 10. Left-hand boundary of image 30 is defined by the rotational angle $\theta_1$ at which location each of antennas 18A-18F are enabled, and right-hand boundary of image 30 is defined by the rotational angle $\theta_2$ at which location each of antennas 18A-18F are disabled FIG. 3 is a graph depicting detection range vs. azimuthal resolution (number of antennas) tradeoff. Various embodiments of radar scanning system 16 can include more or fewer antennas than the seven depicted in FIG. 1 (of which only three can be seen in the perspective of the drawing). Increasing the number of antennas can improve the spatial imaging resolution of the two-dimensional image in the azimuthal direction. As nose-cone 20 is equipped with more antennas, however, the size of each of these antennas necessarily must decrease, because surface area of nose-cone 20 is finite. As the size of each of the antennas decreases, the power of the electromagnetic beam projected thereby also decreases. As the power of the electromagnetic beam decreases, so too does the detection range as signal-to-noise ratio of the electromagnetic beam reflected by objects in the ground-surface field of view and detected by the antenna aligned thereto also decreases. This reduction in the signal-to-noise ratio results in a reduction in overall detection range of the radar system. Thus, there is a tradeoff between the number of antennas and the resulting image quality (e.g., spatial resolution in azimuth vs. detection range).

In FIG. 3, graph 36 illustrates design tradeoffs between number of antennas and detection range and/or spatial resolution. Graph 36 includes horizontal axis 38, first and second vertical axes 40A and 40B, spatial-resolution/antenna-number relation 42A, and detection-range/antenna-number relation 42B. Horizontal axis 38 is indicative of the number of antennas distributed about a rotatable turret of a radar scanning system. First vertical axis 40A is indicative of the spatial resolution of imagery generated by the radar scanning system. Spatial-resolution/antenna-number relation 42A depicts the increasing spatial resolution in azimuth that can be obtained by increasing the number of antennas distributed about the rotatable turret. For example, more swaths of image data can be generated for each rotation as more antennas are distributed about the rotatable turret. Second vertical axis 40B is indicative of the detection range of imagery generated by the radar scanning system. Detection-range/antenna-number relation 42B depicts the decreasing detection range that results from increasing the number of antennas distributed about the rotatable turret.

Using additional antennas results in smaller antenna aperture area available for each antenna. Smaller available aperture area results in reduced antenna gain thereby reducing the detection range of each individual antenna. Consequently, there is a system tradeoff when it comes to choosing the number of antennas. A greater number of antennas will permit a greater number of electromagnetic beams available for scanning the scene during a missile roll cycle (i.e., rotation). Therefore, increasing the number X of antennas will result in an increase in the spatial resolution of the system within the span of azimuthal angles $\phi_A$-$\phi_X$. However, having more antennas means dividing up more of the available surface area along the missile's circumference amongst more antennas thereby reducing the amount of aperture area per antenna. Less available aperture area per antenna results in lower overall gain. A reduction in antenna gain reduces the detection range of each antenna via the radar range equation formula.

To illustrate these tradeoffs by way of example, suppose a series of flat Circuit Card Assemblies (CCAs) is used as patch antenna arrays inscribed in a section of the missile's body dedicated to a radar system. This section of the missile has a length L and the missile's radius is R. If we assume the CCAs form an inscribed polygon in a circle, then the maximum area available for each CCA will be A=2RL sin($\pi$/n) where n is the number of antennas. As the number of antennas n increases, the aperture area A is necessarily reduced. Since antenna gain is related to antenna aperture by the following formula, Eqn. (1):

$$G=(4\pi A\varepsilon)/\lambda^2. \qquad (1)$$

Here in Eqn. (1), $\varepsilon$ is antenna efficiency, G is antenna gain, and $\lambda$ is the wavelength of the electromagnetic radiation). According to Eqn. (1), if antenna aperture is reduced, the antenna gain G will also be reduced. Reduced antenna gain G will adversely impact the detection range of the radar system. This reduction in detection range is illustrated by the radar range equation which describes the minimum detectable range for a radar system, Eqn. (2):

$$R_{min}=[(P_sG^2\lambda^2\sigma)/(P_{min}(4\pi)^3)]^{1/4}. \qquad (2)$$

Here, $P_s$ is the RF emitter source power, $\sigma$ is the radar cross section of the target and $P_{min}$ is the minimum detection power). From the radar range equation (Eqn. (2)) as antenna gain G falls so does the minimum detection range $R_{min}$. Therefore, choosing the number of antennas n for such a radar system architecture requires careful consideration based on applications and needs as there is a tradeoff between azimuthal scan resolution and the maximum detection range of such radar systems.

Figure 4:
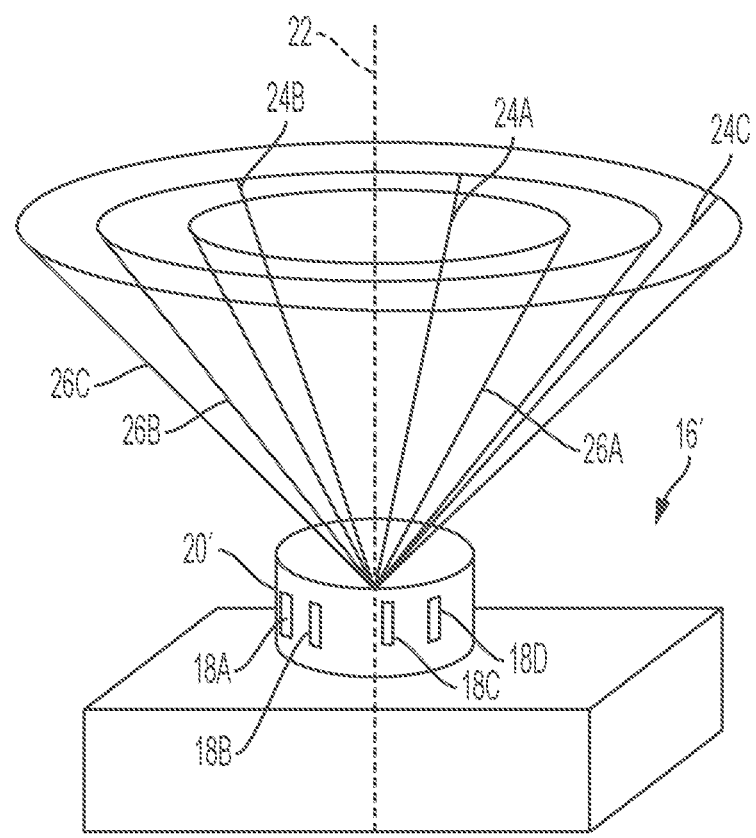
FIG. 4 is a perspective view of a system for scanning an airspace field of view.

FIG. 4 is a perspective view of an alternative embodiment of the rotating antenna concept not used in a missile application. The purpose of FIG. 4 is to highlight how a rotating multi-beam antenna system can be applied in other applications. In this embodiment, a ground-based multi-beam antenna can be used for scanning an airspace field of view. In FIG. 4, radar scanning system 16' includes antennas 18A-18G radially distributed about rotatable turret 20' of radar scanning system 16'. Radar scanning system 16' includes rotator (e.g., a motor) 40 that rotates rotatable turret 20' about rotational axis 22'. Each of antennas 18A-18G is configured to direct a corresponding one of electromagnetic beams 24A-24G outward from rotatable turret 20'. Each of antennas 18A-18G is also configured to detect corresponding electromagnetic beams 24A-24G reflected from objects that intersect their projected beam paths (i.e., system 16 is a monostatic radar system). Electromagnetic beams 24A-24G are directed along principal directions that make azimuthal beam azimuthal beam angles $\phi_A$-$\phi_G$ with rotational axis 22', respectively. Each of azimuthal beam angles $\phi_A$-$\phi_G$ corresponding to antennas 18A-18G, respectively, is different from the other azimuthal beam angles $\phi_A$-$\phi_G$ corresponding to others of antennas 18A-18G, respectively. Each of antennas 18A-18G has a fixed principal direction, respectively.

As rotatable turret 20' of radar scanning system 16' rotates about rotational axis 22' of rotatable turret 20', antennas 18A-18G sequentially direct electromagnetic beams 24A-24G along principal directions that sweep conical FIGS. 26A-26G about rotational axis 22'. Each of these sweeping conical FIGS. 26A-26G intercept airspace field of view 12' along a corresponding path so as to generate a 360° scan (along the roll axis) of airspace field of view 12'. The image processor can construct a two-dimensional image of 360° field of view 12' based on electromagnetic beams 24A-24G reflected thereby and sensed by antennas 18A-18G, respectively.

The image processor can be further configured to determine, based on the electromagnetic beams 24A-24G reflected by objects in the airspace field of view 12' and then received by antennas 18A-18G, directions and/or ranges to objects within the airspace field of view 12', such as, for example, target 14'. Directions to objects can be determined, based on which of electromagnetic beams 24A-24G was directed toward the object. Range and velocity of objects can be determined based on an out-and-back time of flight and Doppler shift, respectively, measured for the particular electromagnetic beam 24A-24G that was directed thereto.

Figure 5:
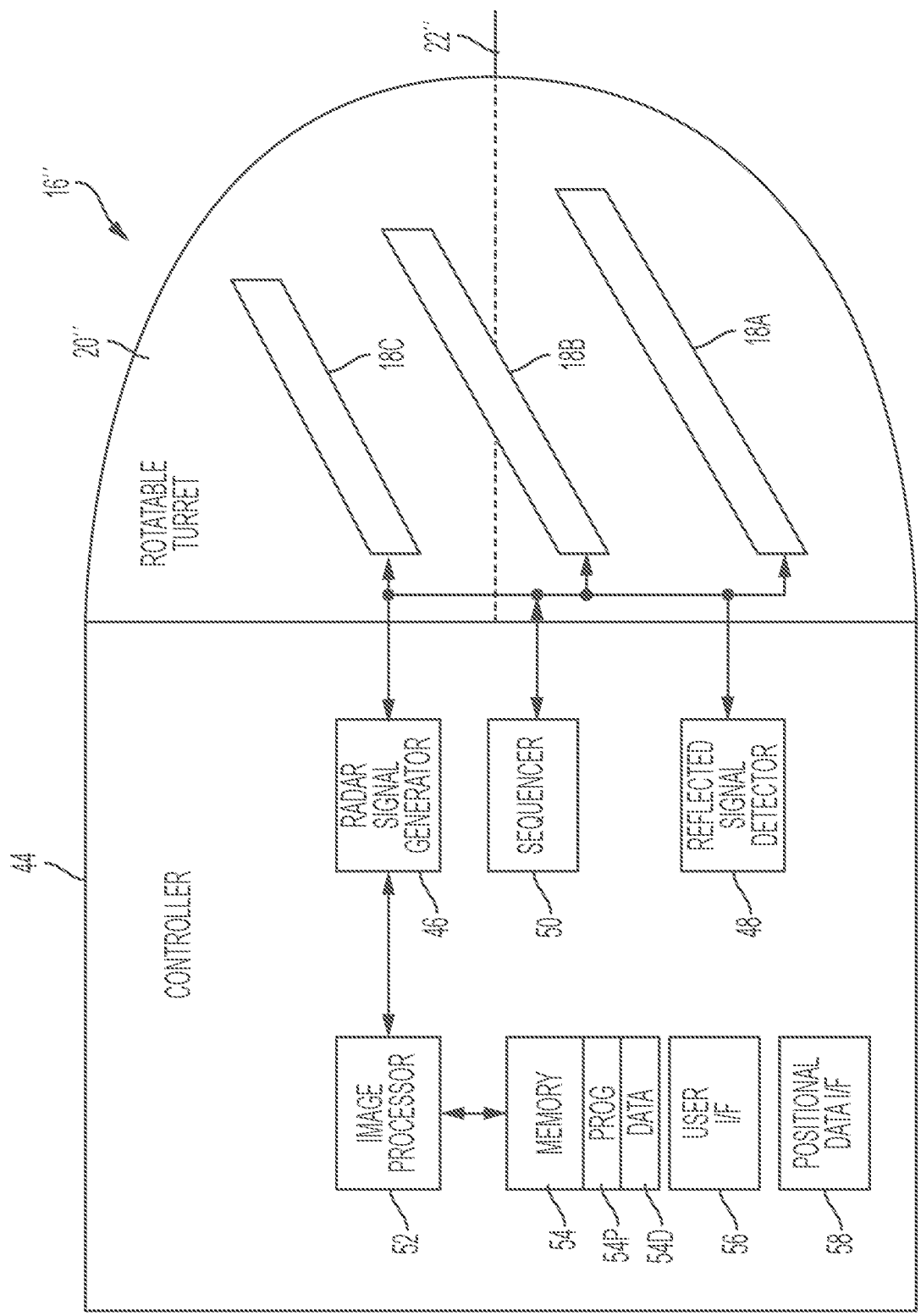
FIG. 5 is a block diagram of an embodiment of a system for radar-scanning a field of view.

FIG. 5 is a block diagram of an embodiment of a system for radar-scanning a field of view. In FIG. 5, radar scanning system 16" or rotatable turret 20" ground system includes controller 44 and rotatable turret 20". Rotatable turret 20" has antennas 18A-18G mounted thereto. Each of antennas 18A-18G is configured to direct electromagnetic beams 24A-24G along principal directions that make azimuthal beam angles $\phi_A$-$\phi_G$ with rotational axis 22", respectively. Controller 44 includes rotator 40' that rotates rotatable turret 20" about rotational axis 22" so as to cause electromagnetic beams 24A-24G to scan a conical figure of space. In some embodiments, rotational axis 22" can be changed so as to change the space which the conical figures scan.

As illustrated in FIG. 5, controller 44 includes radar signal generator 46, reflected signal detector 48, sequencer 50, image processor 52, memory 54, user interface 56 and positional data interface 58. Image processor 52, in one example, is configured to implement functionality and/or process instructions for execution within radar scanning system 16". For instance, image processor 52 can be capable of receiving from and/or processing instructions stored in program memory 54P. Image processor 52 can then execute program instructions so as to cause radar signal generator 46 to generate electromagnetic signals that will cause electromagnetic beams to be projected from antennas 18A-18G. Sequencer 50 can coordinate activities of each of antennas 18A-18G, thereby controlling the field of view that is scanned thereby. Electromagnetic signals reflected by objects in the field of view are detected by reflected signal detector 48. These signals can be processed by signal processor 32 and/or stored in data memory 54D, for example. Image processor 52 can generate a images of the field of view based on such signals generated by reflected signal detector 48. Image processor 52 can also send control commands to the various other subsystems, such as, for example, radar signal generator 46, reflected signal detector 48, sequencer 50.

In various embodiments, radar scanning system 16" can be realized using the elements illustrated in FIG. 5 or various other elements. For example, image processor 52 can include any one or more of a microprocessor, a control circuit, a digital signal image processor (DSP), an application specific integrated circuit (ASIC), a field-programmable gate array (FPGA), or other equivalent discrete or integrated logic circuitry.

Memory 54 can be configured to store information within radar scanning system 16" during operation. Memory 54, in some examples, is described as computer-readable storage media. In some examples, a computer-readable storage media can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 54 is a temporary memory, meaning that a primary purpose of memory 54 is not long-term storage. Memory 54, in some examples, is described as volatile memory, meaning that memory 54 does not maintain stored contents when power to radar scanning system 16" is turned off or interrupted. Examples of volatile memories can include random-access memories (RAM), dynamic random-access memories (DRAM), static random-access memories (SRAM), and other forms of volatile memories. In some examples, memory 54 is used to store program instructions for execution by image processor 52. Memory 54, in one example, is used by software or applications running on radar scanning system 16" (e.g., a software program implementing electrical control of radar signal generator 46, reflected signal detector 48, sequencer 50, etc.) to temporarily store information during program execution, such as, for example, in data memory 54D.

In some examples, memory 54 can also include one or more computer-readable storage media. Memory 54 can be configured to store larger amounts of information than volatile memory. Memory 54 can further be configured for long-term storage of information. In some examples, memory 54 includes non-volatile storage elements. Examples of such non-volatile storage elements can include magnetic hard discs, optical discs, flash memories, or forms of electrically programmable memories (EPROM) or electrically erasable and programmable (EEPROM) memories.

User interface 56 can be used to communicate information between radar scanning system 16" and a user (e.g., an operator, a soldier, etc.). User interface 56 can include a communications module. User interface 56 can include various user input and output devices. For example, User interface can include various displays, audible signal generators, as well switches, buttons, touch screens, mice, keyboards, etc.

User interface 56, in one example, utilizes the communications module to communicate with external devices via one or more networks, such as one or more wireless or wired networks or both. The communications module can include a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB) devices.

Positional data interface 58 can be used to communicate information between radar scanning system 16" and a vehicle positioning system (e.g., a flight control system). Positional data interface 58 can include a communications module. Positional data interface 58 can receive positional information of radar scanning system 16", which can be used by image processor 52 to generate imagery of the field of view scanned by radar scanning system 16". In a missile application, for example, the positional coordinates and attitude can be received by image processor 52 via positional data interface 58. Such positional data can then be used to control sequencer 50 so as to scan a desired field of view. Such positional data can also be used by image processor 52 so as to accurately map the objects that reflect the projected electromagnetic signals into the imagery generated.

Figure 6:
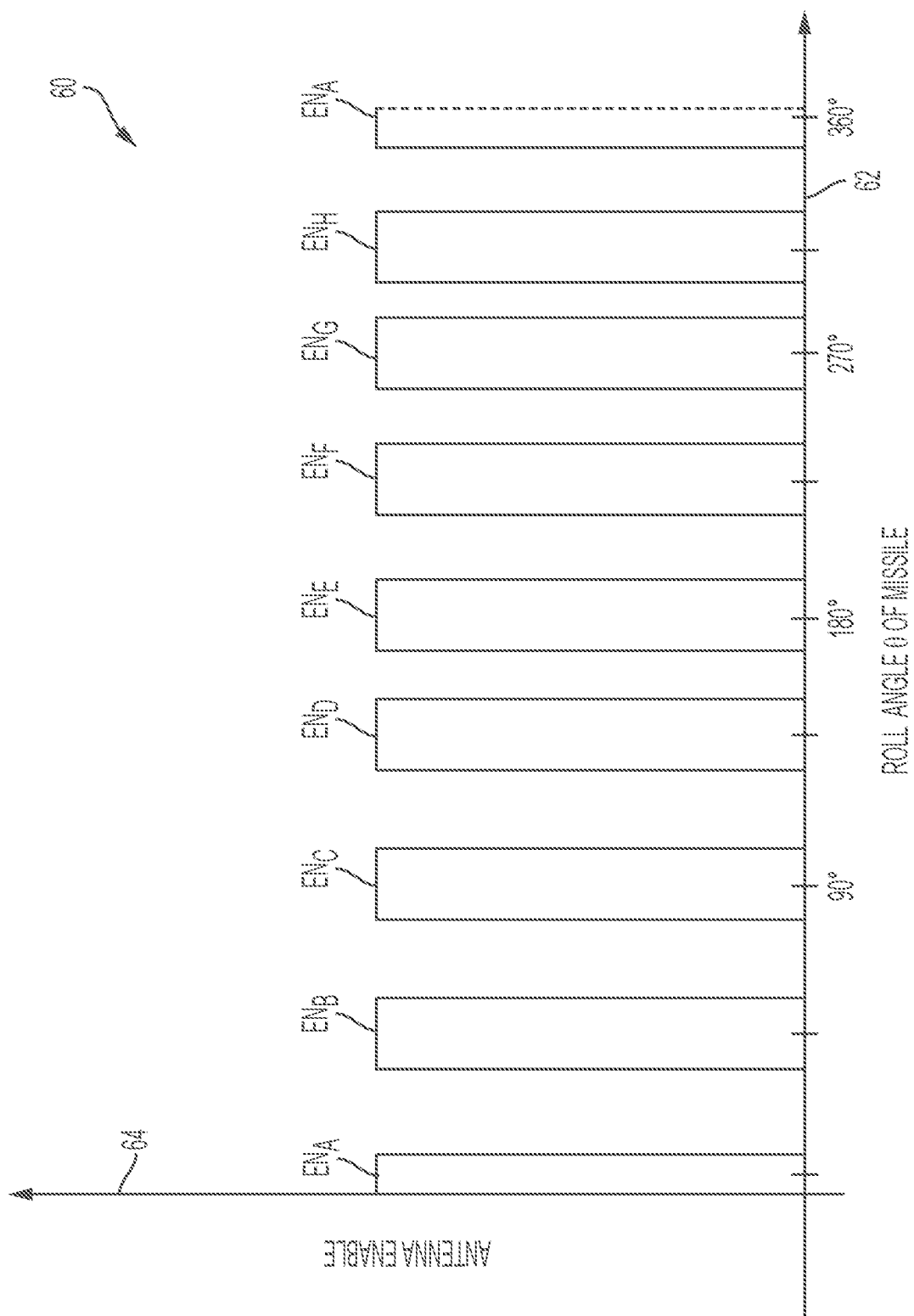
FIG. 6 is a graph depicting sequenced enablement of a plurality of antennas used to scan a field of view.

FIG. 6 is a graph depicting sequenced enablement of a plurality of antennas used to scan a field of view. In FIG. 6 graph 60 includes horizontal axis 62, vertical axis 64 and antenna enablement signals $EN_A$-$EN_H$. Horizontal axis 62 is indicative of roll angle θ of missile 10 (depicted in FIG. 1).

Vertical axis 64 is indicative of enablement signals for a radar scanning system that has eight antennas distributed about nose-cone 20 of missile 10, as indicated by subscript letters A-H. Enablement signals $EN_A$-$EN_H$ indicate when each of antennas 18A-18H of such an eight-antenna radar system are enabled. Each of antennas 18A-18H is enabled when roll-oriented at an angle at which an initial boundary (e.g., a left-hand side boundary) of the field of view to be scanned is aligned with the electromagnetic beam projected thereby. Each of antennas 18A-18H is then disabled when roll-oriented at an angle at which a final boundary (e.g., a right-hand side boundary) of the field of view to be scanned is aligned with the electromagnetic beam projected thereby. In some embodiments, adjacent enablement signals $EN_A$-$EN_H$ are such that as the preceding enablement signal $EN_X$ indicates the preceding antenna being disabled coincides with the subsequent enablement signal $EN_{X+1}$ indicating that the subsequent antenna is being simultaneously enabled. In other embodiments, the enablement signals can overlap, permitting two or more antennas simultaneously operating.

Discussion of Possible Embodiments

The following are non-exclusive descriptions of possible embodiments of the present invention.

Apparatus and associated methods relate to a system for radar-scanning a field of view. The system includes a signal generator, a plurality of antennas, and an image processor. The signal generator generates electromagnetic signals. The plurality of antennas is radially distributed about a rotatable turret. Each of the plurality of antennas is electrically connected to the signal generator so as to receive an electromagnetic signal that causes the antenna to direct an electromagnetic beam along a principal direction characterized by a rotational position θ to which the antenna is rotated by the rotatable turret and an azimuthal beam angle φ with respect to a rotational axis of the rotatable turret. The azimuthal beam angles of the plurality of antennas are different from one another. Each of the plurality of antennas senses a reflected portion of the electromagnetic beam reflected from objects within the field of view upon to which the electromagnetic beam has been directed. As the rotatable turret rotates about the rotational axis, the principal directions sweep conical figures about the rotational axis. At least a portion of the conical figures intersect the field of view. The image processor determines, based on the reflected portions of the electromagnetic beams sensed by the plurality of antennas, directions and/or ranges to and/or velocities of the objects within the field of view.

The system of the preceding paragraph can optionally include, additionally and/or alternatively, any one or more of the following features, configurations and/or additional components:

A further embodiment of the foregoing system can further include a sequencer that sequentially activates each of the plurality of antennas in sequence when the principal direction of the antenna is rotationally positioned so as to direct the electromagnetic beam toward the field of view.

A further embodiment of any of the foregoing systems can further include a sequencer that sequentially deactivates each of the plurality of antennas in sequence when the principal direction of the antenna is rotationally positioned so as to not direct the electromagnetic beam toward the field of view.

A further embodiment of any of the foregoing systems can further include a sequencer that sequentially activates each of the plurality of antennas when the antenna is at a first rotational position $\theta_1$ and deactivates each of the plurality of antennas when the antenna is at a second rotational position $\theta_2$, wherein the first rotational position $\theta_1$ and the second rotational position $\theta_2$ determine boundaries of the field of view.

A further embodiment of any of the foregoing systems can further include a rotator that rotates the rotatable turret about the rotational axis.

A further embodiment of any of the foregoing systems, wherein each of the plurality of antennas can be a patch antenna.

A further embodiment of any of the foregoing systems, wherein each of the plurality of antennas can be a waveguide antenna.

A further embodiment of any of the foregoing systems, wherein the rotatable turret can be a nose-cone of a projectile or missile.

Some embodiments relate to a system for radar-scanning a ground-surface field of view. The system includes a signal generator, a plurality of antennas and an image processor. The signal generator generates electromagnetic signals. The plurality of antennas are radially distributed about a nose-cone of a missile. Each of the plurality of antennas is electrically connected to the signal generator so as to receive an electromagnetic signal that causes the antenna to direct an electromagnetic beam along a principal direction characterized by a roll orientation θ to which the antenna is rotated by the missile and an azimuthal beam angle φ with respect to a roll axis of the missile. The azimuthal beam angles of the plurality of antennas are different from one another. Each of the plurality of antennas senses a reflected portion of the electromagnetic beam reflected from objects within the ground-surface field of view upon to which the electromagnetic beam has been directed. As the missile rotates about the roll axis, the principal directions sweep conical figures about the roll axis. At least a portion of the conical figures intersect the ground-surface field of view. The image processor determines, based on the reflected portions of the electromagnetic beams sensed by the plurality of antennas, directions and/or ranges to and/or velocities of the objects within the ground-surface field of view.

The system of the preceding paragraph can optionally include, additionally and/or alternatively, any one or more of the following features, configurations and/or additional components:

A further embodiment of the foregoing system can further include a sequencer that sequentially activates each of the plurality of antennas in sequence when the principal direction of the antenna is rotationally positioned so as to direct the electromagnetic beam toward the field of view.

A further embodiment of any of the foregoing systems can further include a sequencer that sequentially deactivates each of the plurality of antennas in sequence when the principal direction of the antenna is rotationally positioned so as to not direct the electromagnetic beam toward the field of view.

A further embodiment of any of the foregoing systems can further include a sequencer that sequentially activates each of the plurality of antennas when the antenna is at a first rotational position $\theta_1$ and deactivates each of the plurality of antennas when the antenna is at a second rotational position $\theta_2$, wherein the first rotational position $\theta_1$ and the second rotational position $\theta_2$ determine boundaries of the field of view.

A further embodiment of any of the foregoing systems, wherein each of the plurality of antennas can be a patch antenna.

A further embodiment of any of the foregoing systems, wherein each of the plurality of antennas can be a waveguide antenna.

A further embodiment of any of the foregoing systems can further include a nose-cone rotator that rotates the nose-cone about the roll axis.

Some Embodiments Relate to a Method

The method of the preceding paragraph can optionally include, additionally and/or alternatively, any one or more of the following features, configurations and/or additional components:

A further embodiment of the foregoing method for radar-scanning a field of view. the method includes generating, via a signal generator, electromagnetic signals. The method includes receiving, via a plurality of antennas radially distributed about a rotatable turret, the electromagnetic signals generated by the signal generator. The method includes rotating the rotatable turret about a rotational axis. The method includes directing, via each of the plurality of antennas, an electromagnetic beam along a principal direction characterized by a rotational position θ to which the antenna is rotated by the rotatable turret and an azimuthal beam angle ϕ with respect to a rotational axis of the rotatable turret. The azimuthal beam angles of the plurality of antennas are different from one another. As the rotatable turret rotates about the rotational axis, the principal directions sweep conical figures about the rotational axis. At least a portion of the conical figures intersect the field of view. The method includes sensing, via each of the plurality of antennas, a reflected portion of the electromagnetic beam reflected from objects within the field of view upon to which the electromagnetic beam has been directed. The method also includes determining, via an image processor and based on the reflected portions of the electromagnetic beams sensed by the plurality of antennas, directions and/or ranges to and/or velocities of the objects within the field of view.

A further embodiment of any of the foregoing methods can further include sequentially activating, via a sequencer, each of the plurality of antennas in sequence when the principal direction of the antenna is rotationally positioned so as to direct the electromagnetic beam toward the field of view.

A further embodiment of any of the foregoing methods can further include sequentially deactivating, via a sequencer, each of the plurality of antennas in sequence when the principal direction of the antenna is rotationally positioned so as to not direct the electromagnetic beam toward the field of view.

A further embodiment of any of the foregoing methods can further include sequentially activating, via a sequencer, each of the plurality of antennas when the antenna is at a first rotational position $\theta_1$, and sequentially deactivating, via the sequencer, each of the plurality of antennas when the antenna is at a second rotational position $\theta_2$, wherein the first rotational position $\theta_1$ and the second rotational position $\theta_2$ determine boundaries of the field of view.

A further embodiment of any of the foregoing methods can further include rotating, via a rotator, the rotatable turret about the rotational axis.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for radar-scanning a field of view, the system comprising:
   a signal generator that generates electromagnetic signals;
   a plurality of antennas radially distributed about a nose cone of a projectile, each of the plurality of antennas electrically connected to the signal generator so as to receive an electromagnetic signal that causes the antenna to direct an electromagnetic beam along a principal direction characterized by a rotational position θ to which the antenna is rotated by the nose cone of the projectile and an azimuthal beam angle ϕ with respect to a rotational axis of the nose cone of the projectile, the azimuthal beam angles of the plurality of antennas being different from one another, each of the plurality of antennas sensing a reflected portion of the electromagnetic beam reflected from objects within the field of view upon to which the electromagnetic beam has been directed,
   wherein as the nose cone of the projectile rotates about the rotational axis the principal directions sweep conical figures about the rotational axis, at least a portion of the conical figures intersecting the field of view; and
   an image processor that determines, based on the reflected portions of the electromagnetic beams sensed by the plurality of antennas, directions and/or ranges to and/or velocities of the objects within the field of view.

2. The system of claim 1, further comprising:
   a sequencer that sequentially activates each of the plurality of antennas in sequence when the principal direction of the antenna is rotationally positioned so as to direct the electromagnetic beam toward the field of view.

3. The system of claim 1, further comprising:
   a sequencer that sequentially deactivates each of the plurality of antennas in sequence when the principal direction of the antenna is rotationally positioned so as to not direct the electromagnetic beam toward the field of view.

4. The system of claim 1, further comprising:
   a sequencer that sequentially activates each of the plurality of antennas when the antenna is at a first rotational position $\theta_1$ and deactivates each of the plurality of antennas when the antenna is at a second rotational position $\theta_2$, wherein the first rotational position $\theta_1$ and the second rotational position $\theta_2$ determine boundaries of the field of view.

5. The system of claim 1, further comprising:
   a rotator that rotates the nose cone of the projectile about the rotational axis.

6. The system of claim 1, wherein each of the plurality of antennas is a patch antenna.

7. The system of claim 1, wherein each of the plurality of antennas is a waveguide antenna.

8. A system for radar-scanning a ground-surface field of view, the system comprising:
   a signal generator that generates electromagnetic signals;
   a plurality of antennas radially distributed about a nose-cone of a missile, each of the plurality of antennas electrically connected to the signal generator so as to receive an electromagnetic signal that causes the antenna to direct an electromagnetic beam along a principal direction characterized by a roll orientation θ to which the antenna is rotated by the missile and an azimuthal beam angle ϕ with respect to a roll axis of the missile, the azimuthal beam angles of the plurality of antennas being different from one another, each of the plurality of antennas sensing a reflected portion of the electromagnetic beam reflected from objects within the ground-surface field of view upon to which the electromagnetic beam has been directed, wherein as the missile rotates about the roll axis the principal directions sweep conical figures about the roll axis, at least a portion of the conical figures intersecting the ground-surface field of view; and an image processor that determines, based on the reflected portions of the electromagnetic beams sensed by the plurality of antennas, directions and/or ranges to and/or velocities of the objects within the ground-surface field of view.

9. The system of claim 8, further comprising:

a sequencer that sequentially activates each of the plurality of antennas in sequence when the principal direction of the antenna is rotationally positioned so as to direct the electromagnetic beam toward the field of view.

10. The system of claim 8, further comprising:

a sequencer that sequentially deactivates each of the plurality of antennas in sequence when the principal direction of the antenna is rotationally positioned so as to not direct the electromagnetic beam toward the ground-surface field of view.

11. The system of claim 8, further comprising:

a sequencer sequentially activates each of the plurality of antennas when the antenna is at a first rotational position $\theta_1$ and deactivates each of the plurality of antennas when the antenna is at a second rotational position $\theta_2$, wherein the first rotational position $\theta_1$ and the second rotational position $\theta_2$ determine boundaries of the field of view.

12. The system of claim 8, wherein each of the plurality of antennas is a patch antenna.

13. The system of claim 8, wherein each of the plurality of antennas is a waveguide antenna.

14. The system of claim 8, further comprising:

a nose-cone rotator that rotates the nose-cone about the roll axis.

15. A method for radar-scanning a field of view, the method comprising:

generating, via a signal generator, electromagnetic signals;

receiving, via a plurality of antennas radially distributed about a nose-cone of a projectile or missile, the electromagnetic signals generated by the signal generator;

rotating the nose-cone of the projectile or missile about a rotational axis;

directing, via each of the plurality of antennas, an electromagnetic beam along a principal direction characterized by a rotational position θ to which the antenna is rotated by the nose-cone of the projectile or missile and an azimuthal beam angle ϕ with respect to a rotational axis of the nose-cone of the projectile or missile, the azimuthal beam angles of the plurality of antennas being different from one another, wherein as the nose-cone of the projectile or missile rotates about the rotational axis the principal directions sweep conical figures about the rotational axis, at least a portion of the conical figures intersecting the field of view;

sensing, via each of the plurality of antennas, a reflected portion of the electromagnetic beam reflected from objects within the field of view upon to which the electromagnetic beam has been directed; and determining, via an image processor and based on the reflected portions of the electromagnetic beams sensed by the plurality of antennas, directions and/or ranges to and/or velocities of the objects within the field of view.

16. The method of claim 15, further comprising:

sequentially activating, via a sequencer, each of the plurality of antennas in sequence when the principal direction of the antenna is rotationally positioned so as to direct the electromagnetic beam toward the field of view.

17. The method of claim 15, further comprising:

sequentially deactivating, via a sequencer, each of the plurality of antennas in sequence when the principal direction of the antenna is rotationally positioned so as to not direct the electromagnetic beam toward the field of view.

18. The method of claim 15, further comprising;

sequentially activating, via a sequencer, each of the plurality of antennas when the antenna is at a first rotational position $\theta_1$; and sequentially deactivating, via the sequencer, each of the plurality of antennas when the antenna is at a second rotational position $\theta_2$, wherein the first rotational position $\theta_1$ and the second rotational position $\theta_2$ determine boundaries of the field of view.

19. The method of claim 15, wherein rotating the nose-cone of the projectile or missile about the rotational axis comprises:

rotating, via a rotator, the nose-cone of the projectile or missile about the rotational axis.

\* \* \* \* \*